March 25, 1969 R. J. BERGMAN ET AL 3,435,435

SOLID STACK MEMORY

Filed Oct. 24, 1965 Sheet 1 of 6

INVENTORS
ROBERT J. BERGMAN
LEROY A. PROHOFSKY
BY Charles [signature]
ATTORNEY

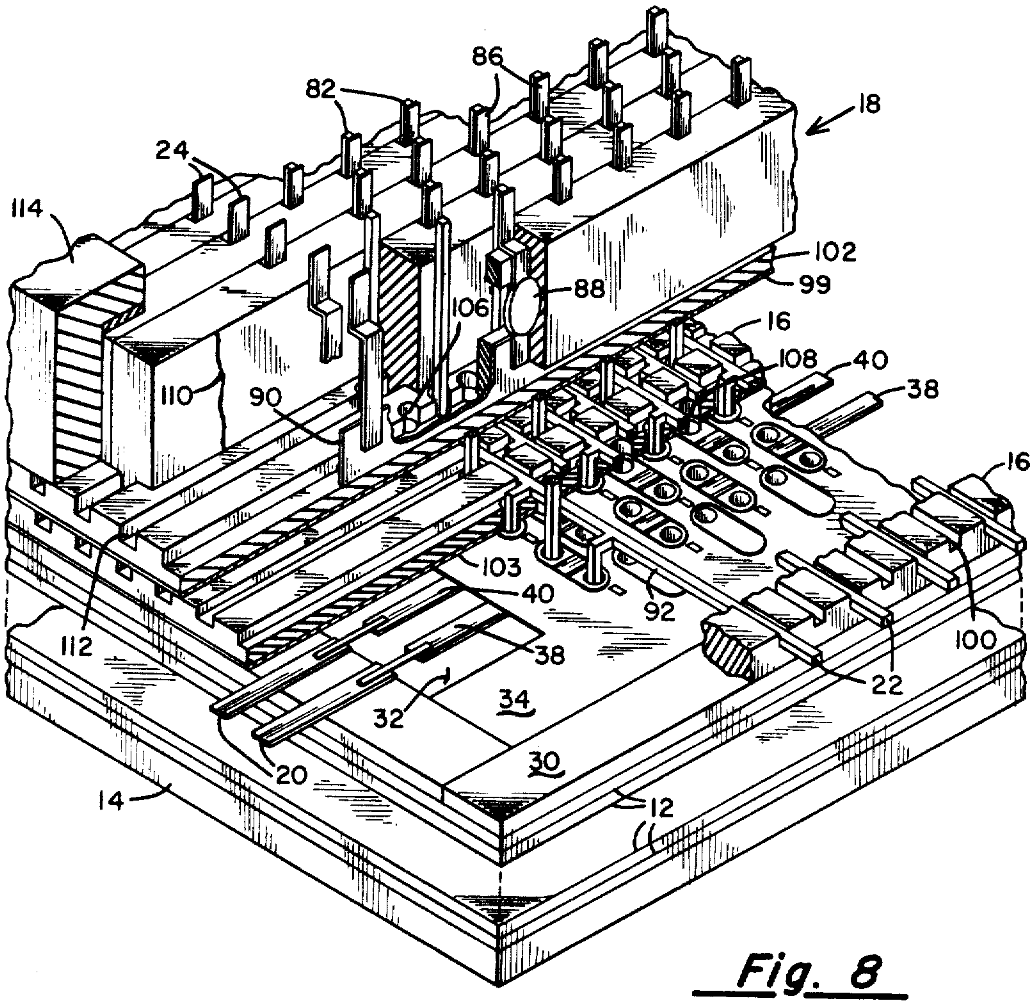
Fig. 8
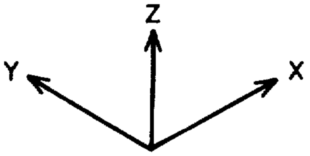

United States Patent Office 3,435,435
Patented Mar. 25, 1969

3,435,435
SOLID STACK MEMORY
Robert J. Bergman, St. Paul, and Le Roy A. Prohofsky, Minneapolis, Minn., assignors to Sperry Rand Corporation, New York, N.Y., a corporation of Delaware
Filed Oct. 24, 1965, Ser. No. 504,543
Int. Cl. G11b 5/00
U.S. Cl. 340—174 12 Claims

ABSTRACT OF THE DISCLOSURE

An electrically-alterable, random-access memory system that uses mated-film elements as the memory cells with orthogonally oriented drive fields.

The value of the utilization of small elements of magnetizable material as logical memory elements in electronic data processing systems is well known. As used herein, the term "magnetizable material" shall refer to a material having the characteristic of substantial magnetic remanence, the term being sufficiently broad to encompass material having a substantially rectangular hysteresis loop characteristic. This value is based upon the bistable characteristics of magnetizable elements which characteristics include the ability to remain in, or remember, magnetic conditions which conditions may be utilized to indicate a binary "1" or "0." As the use of magnetizable memory elements in electronic data processing equipment increases, a primary means of improving the computational speed of the machines is to utilize memory elements that possess the property of nondestructive readout, for by retaining the initial state of remanent magnetization after readout, the rewrite cycle required with destructive readout devices is eliminated. As used herein, the term "nondestructive readout" shall refer to the sensing of the relative direction or state of the remanent magnetization of the magnetizable element without destroying or reversing the polarization of such remanent magnetization. This should not be interpreted to mean that the state of the remanent magnetization of the element being sensed is not temporarily disturbed during such nondestructive readout.

Recent developments include the use of magnetizable memory elements of thin ferromagnetic films that are capable of operating in a single domain rotation mode providing much higher switching speeds than prior art toroidal ferrite core devices. These thin ferromagnetic film elements are open flux path cores and are described as having single-domain properties. The term "single domain property" may be considered the characteristic of a three dimensional element of magnetizable material having a thin dimension that is substantially less than the width and length thereof wherein no magnetic domain walls can exist parallel to the large surface of the element. These single-domain elements provide single-domain rotational switching and generally possess the characteristic of uniaxial anisotropy so as to provide a magnetic "easy" axis along which the element's remanent magnetization vector M shall reside when the external magnetizing force in the area of the element is substantially zero.

Extensive research has been expended upon developing memory elements that lend themselves to fast, economical fabrication and assembly into compact three dimensional memory arrays. Thin-ferromagnetic-films such as fabricated in accordance with S. M. Rubens Patent No. 2,900,282 and A. V. Pohn Patent No. 3,065,105 and assembled into three dimensional memory arrays such as disclosed in S. M. Rubens et al. Patent Nos. 3,030,612 and 3,155,561, have achieved high bit densities. Additionally, multiple-layer coupled-film memory elements such as disclosed in A. V. Pohm Patent Nos. 3,051,807 and 3,125,743 and R. S. Moore Patent No. 3,095,555 have been utilized to provide more efficient memory elements. However, such multiple layer elements comprising individual layers of differing magnetic properties, when produced by methods such as disclosed in the aforementioned S. M. Rubens et al. Patent No. 3,155,561, have resulted in low producibility yields. This is so as the differing magnetic characteristics of the individual film layers are critical limitations to the proper operation of such multiple layer elements. Accordingly, extensive research has been expended upon developing multiple layered memory elements wherein all layers are of substantially the same magnetic characteristic. Such an arrangement is disclosed and taught in the copending application of F. R. Janisch et al., Ser. No. 356,165, filed Mar. 31, 1964 and which has been abandoned, and assigned to the same assignee as is the present invention, which multiple layered elements, like all other herein before mentioned multiple layered memory elements, are comprised of substantially open flux path layers of magnetizable material.

Although a compact coincident-current (bit-organized) memory array utilizing thin ferromagnetic films as the memory element has been postulated for many years, see the article "A Compact-Current Memory," A. V. Pohm and S. M. Rubens, Proceedings of the Eastern Joint Computer Conference, Dec. 10–12, 1956, the only known commercial use of a memory array utilizing planar, open-flux-path, thin-ferromagnetic-films as the memory element has been in the Univac 1107 Computer as a control memory. The major reason that thin ferromagnetic films have not found extensive use as memory elements in electronic data processing systems is that the previously described substantially open flux path type memory elements are highly susceptable to loss of their magnetic state by repeated subjection to low-level partial-select pulses or extraneous noise signals or fields. Attempts to overcome this problem of loss of information when the memory element is subjected to a plurality of low level pulse fields, such as half-select pulses in a bit-organized memory or bit drive fields in a word-organized memory, have produced many memory arrangements including the use of a DC bias field as disclosed in the copending application of J. H. Scheuneman, Ser. No. 479,999, filed Aug. 16, 1965, and assigned to the same assignee as is the present invention. However, it is extremely desirable that the memory system may be in a relatively static condition, i.e., a condition when no biasing fields are applied to the memory elements, during memory system operation.

The phenomenon whereby substantially open-flux-path thin-ferromagnetic-film elements lose their magnetic information, i.e., when the magnetic informational state of the element concerned is so effected as to produce indistinguishable signals as regarding a previously stored logical "1" or "0," when subjected to a plurality of low-level pulsed-fields is called "creep." Creep is the phenomenon whereby the coercivity of a thin ferromagnetic film may, under certain pulsed conditions, be substantially less than the coercivity under direct current conditions. Investigations of the operation of substantially open-flux-path thin-ferromagnetic-film elements in matrix arrays indicates that the loss of information in individual memory elements thereof is primarily due to the creep phenomenon. For a more detailed discussion of the creep phenomenon see the article "Magnetization Creep in Thin Nickel-Iron Films," A. L. Olson and E. J. Torok, Journal of Applied Physics, vol. 36, No. 3, March 1965, pp. 1058–1059.

The word-organized memory system of the present invention utilizes a novel memory element as the memory cell. The mated-film element of the present invention is a magnetizable memory element that is similar in many respects to the multilayered open-flux-path planar magnetizable memory elements disclosed in the herein above mentioned patents. Such elements usually have uniaxial anisotropy, i.e., have a preferred, or easy, axis along which the element's remanent magnetization will lie, and are normally operated so that switching of the element's magnetization, i.e., 180° reversal of the element's magnetization, occurs by rotation of the element's magnetic vector M rather than by magnetic wall motion. This single-domain rotational switching mode is more fully discussed in the S. M. Rubens et al. Patent No. 3,030,612.

A main distinction between the coupled-film elements of the herein and above discussed patents and the mated-film element of the present invention is that the layers of the coupled-film elements have substantially open flux return paths intercoupling the flux of the coupled layers whereas the mated-film element layers of the present invention have substantially closed flux return paths intercoupling the flux of the mated-film element layers. The mated-film element utilized by the present invention includes two thin-ferromagnetic-film layers that are formed in a stacked, superposed relationship about a suitable drive line and whose overlapping sides form closely-coupled portions creating a substantially-closed flux path about the enveloped drive line. The enveloped drive line is typically a common bit and sense line, used to sense the element's output during the read operation and to carry bit current during the write operation. The axis of anisotropy, or easy axis, is in the circumferential direction about the enveloped drive line, i.e., orthogonal to the longitudinal axis of the enveloped drive line, whereby the enveloped drive line provides a longitudinal drive field $H_l$ in a circumferential direction about the enveloped drive line in the area of the mated-film element causing the flux in the two layers of the mated-film element to become aligned in an antiparallel relationship. A drive line, designated the word drive line envelopes the mated-film element and is oriented in the area of the mated-film element with its longitudinal axis orthogonal to the plane of and to the easy axis of the mated-film element whereby the enveloping word drive line, when coupled by an appropriate current signal, produces a transverse drive field $H_t$ in the area of the mated-film element.

The resulting product constitutes a memory cell that possesses all the desirable characteristics of a planar thin-ferromagnetic-film memory element while substantially reducing the effects of the creep phenomenon. As the individual layers of magnetizable material of the mated-film element are of substantially the same material, such as Permalloy, fabricating problems inherent in the Bicore and Tricore memory elements of the herein and above discussed Patent Nos. 3,015,807 and 3,095,555 are eliminated while yet producing a word-organized, three-dimensional memory array capable of operating in the nondestructive readout mode or destructive readout mode as a function of the intensities of the applied drive fields.

The above described mated-film element and the enveloping word line permit a novel packaging technique providing much higher than previously obtainable bit densities. The memory package is comprised of a plurality of stacked, similar memory planes wherein each memory plane includes a plurality of pairs of apertures with a like plurality of similar memory elements therebetween. Each of the word lines is passed down through matching apertures, through the plurality of stacked memory planes, and returns up through matching apertures of matching pairs of apertures that envelop the associated memory elements. First ends of all word lines along the first Y-direction are coupled to a common first Y selection bus-bar while the second end of each word line along a second, orthogonal X-direction are separately coupled by separate diodes to a common second X selection bus-bar. Thus, by selecting one of the X selection bus-bars and one of the Y selection bus-bars the word line common to the two selected bus-bars is caused to couple a word drive field $H_t$ to the coupled memory elements.

As described above the line enveloped by the memory element serves as a common bit and sense line. In the preferred embodiment of the present invention each memory plane has two separate bit lines that pass through the plane in a parallel manner; each separate bit line coupling one-half of the memory elements of the memory plane. The parallel bit lines are at one end directly intercoupled while the opposite ends are intercoupled by a first winding of a selection transformer. The differential sense amplifier is coupled across the intercoupled first ends of the parallel bit lines and a center tap on the selection transformer first winding. This arrangement permits the parallel bit lines to act as a balanced strip-line pair providing common mode rejection of spurious noise signals at the differential sense amplifier. The bit driver is coupled to the parallel bit lines by means of a second winding on the selection transformer providing transformer coupling of the bipolar longitudinal bit drive fields $\pm H_l$ utilized for the writing operation.

This arrangement provides a memory package having four connections per memory plane and X-connections along the X-direction and Y-connections along the Y-direction. Thus, in the illustrated embodiment whereby there are 128 memory planes providing words of 128 bits in length (there are as many bits per word as there are memory planes per memory stack) and whereby each memory plane comprises a 32 x 32 array of memory elements (there are 1,024 memory elements per plane with 32 memory elements in the X-direction and 32 memory elements in the Y-direction) there is provided a three-dimensional array of 1,024 words of 128 bits in length requiring only 4 electrical connections per plane, only 32 electrical connections in the X-direction and only 32 electrical connections in the Y-direction for total of only 576 external electrical connections per three-dimensional stack.

Accordingly, it is a primary object of this invention to provide a novel memory element and packaging thereof.

It is another object of this invention to provide a novel word-organized memory system utilizing planar mated-film elements as the memory cells and having vertical word drive lines and which system is capable of operation in the destructive readout mode or the nondestructive readout mode as a function of the relative intensities of the applied drive fields.

These and other more detailed and specific objectives will be disclosed in the following specification, reference being had to the accompanying drawings in which:

FIG. 8 is an isometric view of a cut away view of the top portion of the memory stack of FIG. 1.

Figure 1:
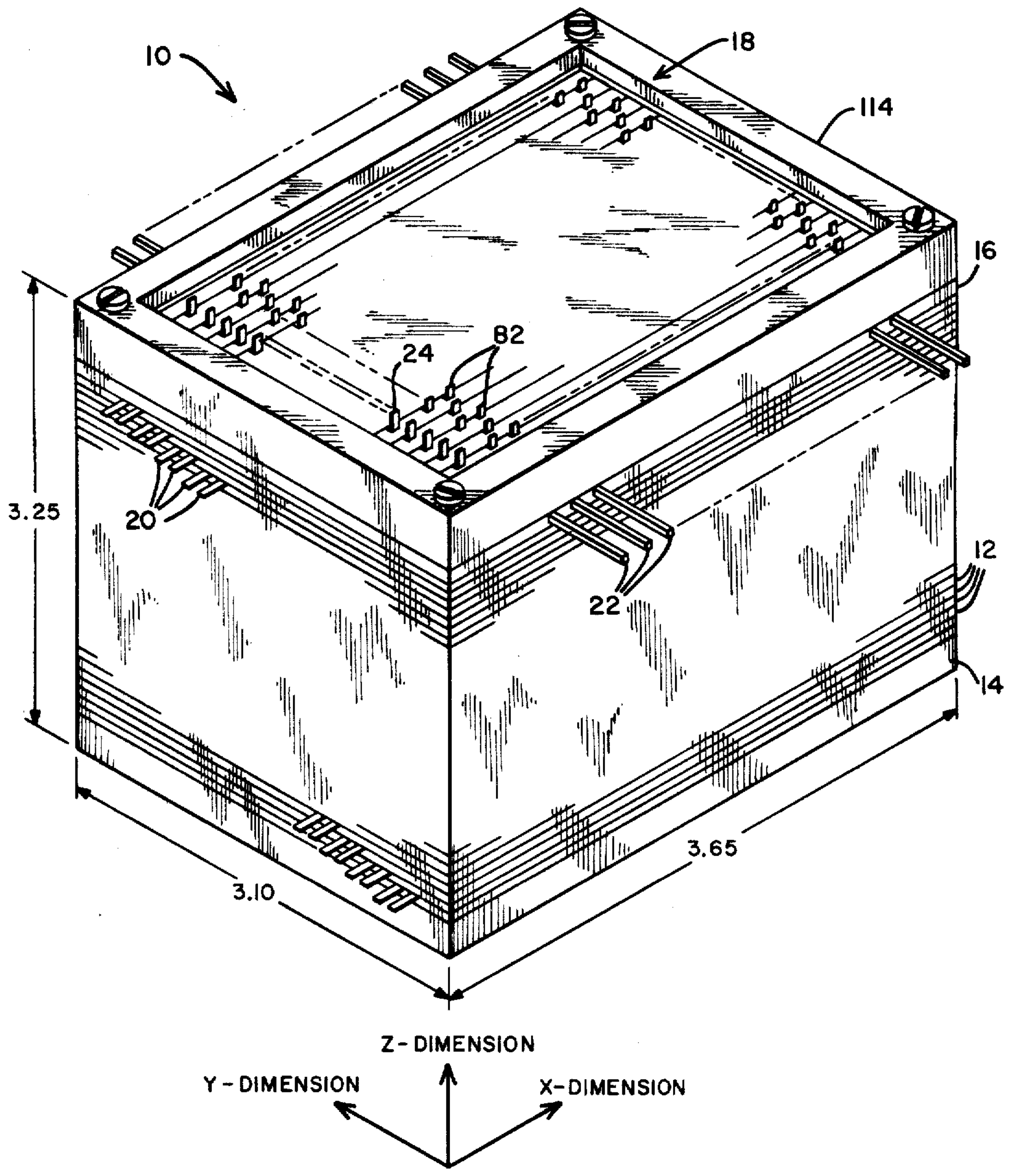
FIG. 1 is an isometric view of the memory stack of the present invention.

With particular reference to FIG. 1 there is presented an isometric view of memory stack 10 which is comprised of 128 memory planes 12 sandwiched between base plate 14 and top plate 16 upon which are mounted 32 diode assemblies 18. Memory stack 10 provides a random access, electrically-alterable, nondestructive readout memory system having a capacity of 1,024 words each of 128 bits in length and is arranged in 128 memory planes 12 each plane having a 32 x 32 array of memory cells. Projecting from the surface of memory stack 10 are: 512 bit-sense line leads 20, 4 leads 20 per memory plane 12, staggered so as to provide maximum connector clearance therebetween; 32 common bus-leads 22. 16 each side; and 32 diode bus-leads 24. These 576 leads provide all the necessary electronic interconnection between the 1,024 words of memory storage and the external memory electronics.

Figure 2:
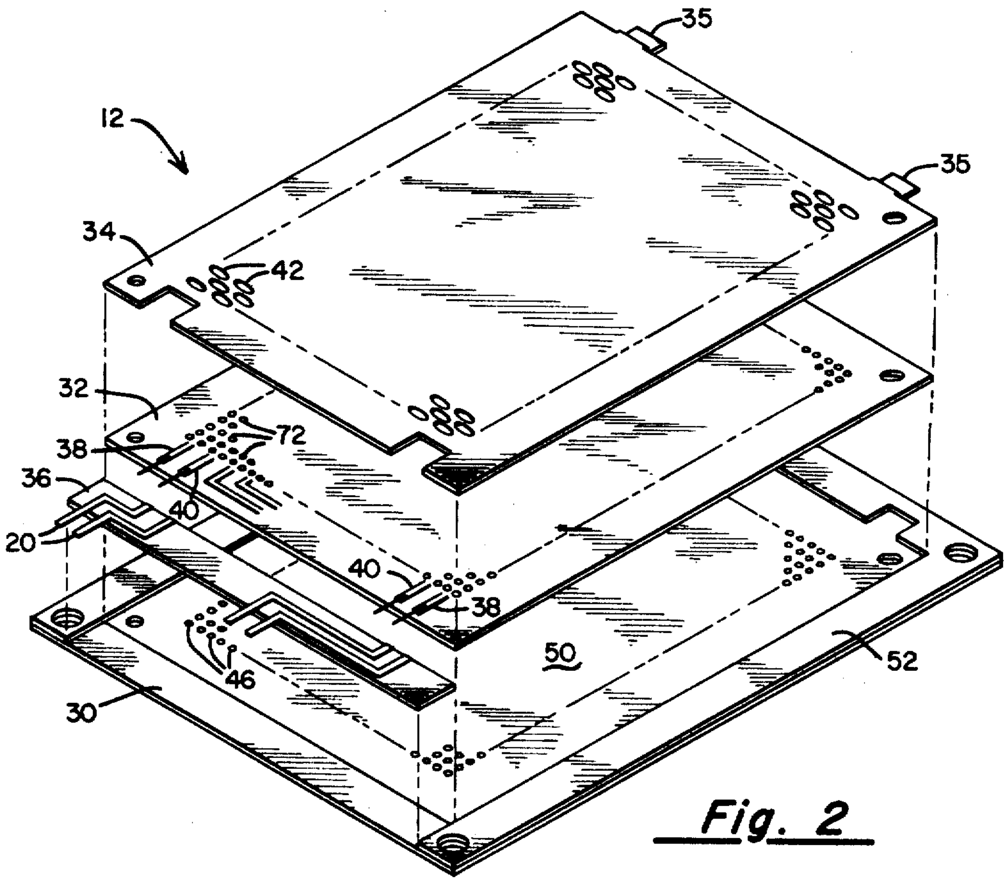
FIG. 2 is an exploded view of a memory plane of the present invention.

With particular reference to FIG. 2 there is illustrated an exploded view of memory plane 12 showing the stacked arrangement of shield-plate 30, substrate 32, shield 34 and terminal strip 36. Shield-plate 30 and shield 34 are welded, or soldered, together at tabs 35 functioning as intercoupled ground planes providing electrostatic shielding of all external fields from the internally sandwiched memory elements on substrate 32. Additionally, as the word lines pass through memory plane 12 perpendicular to the associated sense lines electromagnetic coupling therebetween is substantially zero. In the illustrated embodiment shield-plate 30, substrate 32 and shield 34 are substantially similar for all memory planes 12 while terminal strip 36 has its pairs of bit-sense leads 20 arranged in a staggered manner, as exemplified by the illustrated embodiment of FIGURE 1, to provide maximum connector clearance between adjoining memory planes 12. Memory plane 12 is an integral assembly of its constitutent parts formed by the bonding of such parts by a suitable adhesive and the welding, or soldering, or pairs of bit-sense lines 38, 40 to the correspondingly ordered pair of bits-sense leads 20 of terminal strip 36.

Figure 3:
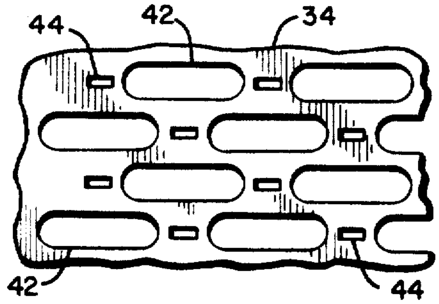
FIG. 3 is an illustration of the detail of the aperture arrangement in the shield of FIG. 2.

With particular reference to FIG. 3 there is illustrated a detail of the aperture arrangement in shield 34. Shield 34 is a sheet of high permeability material, such as Conetic, and is 0.002 inch thick. Transverse drive field apertures 42 and flux blocking apertures 44 are arranged in sheild 34 to cooperate with the like-arranged memory elements and apertures of substrate 32. As will be more fully described herein below shield 34 performs the function of a "keeper" providing a high permeability return path for the flux generated by the vertical word lines passing through apertures 42 and whereby apertures 44 prevent the transfer of flux between adjoining memory elements.

Figure 4:
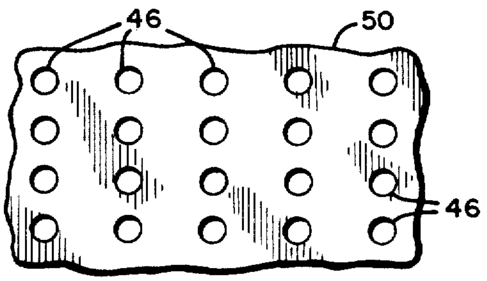
FIG. 4 is an illustration of the detail of the hole pattern in the shield-plate of FIG. 2.

With particular reference to FIG. 4 there is illustrated a detail of the hole pattern in shield-plate 30. As illustrated in FIGURE 2 shield-plate 30 performs the function of a support and locating member for substrate 32 and shield 34. Shield-plate 30 consists of a 0.004 inch thick copper-beryllium base plate 50 and 0.011 inch thick epoxy-glass laminated frame 52 bounded thereto by a suitable adhesive material. Holes 46 are positioned in shield-plate 30 so as to cooperate with apertures 42 of shield 30 and like-arranged holes in substrate 32 to permit the vertically oriented word lines, which word lines will be discussed herein below, to pass therethrough.

Figures 5, 9:
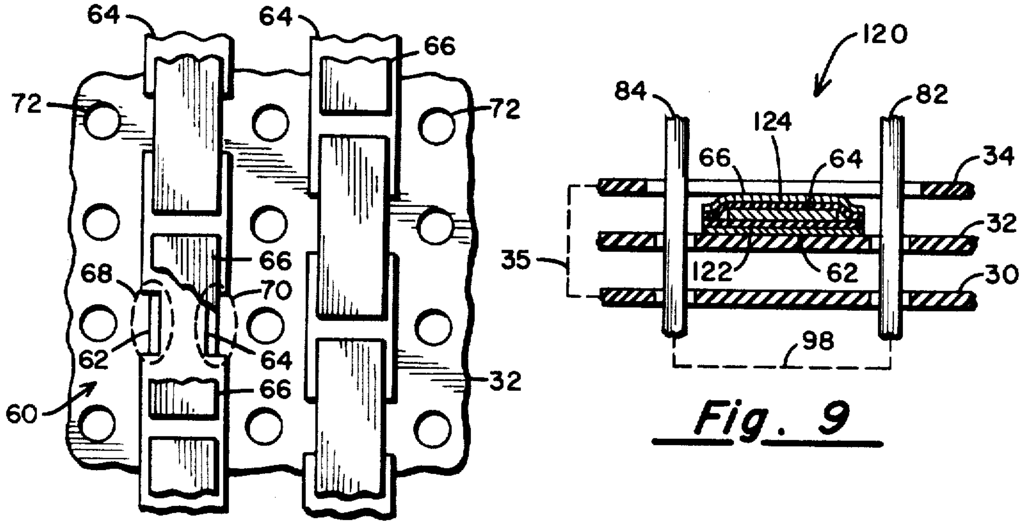
FIG. 5 is an illustration of the arrangement of the memory elements in the memory plane of FIG. 2.
FIG. 9 is a diagrammatic illustration of a cross section of the memory element of FIG. 10.

With particular reference to FIG. 5 there is illustrated a detail of the arrangement of the memory elements on substrate 32. FIG. 5 illustrates the plan view of a single mated-film element 60 wherein there is illustrated a stacked arrangement of substrate 32, a thin-ferromagnetic film layer 62, an evaporated copper conductor 64 and a thin-ferromagnetic film layer 66. As will be described in more detail herein below, bit line 64 is insulated from layers 64 and 66 by a suitabe matelrial such as a vapor deposited layer of silicon monoxide (SiO), such insulating layers not illustrated for the sake of clarity. Areas 68 and 70 are the mated-film areas of memory element 60 wherein layers 62 and 66 are not magnetically insulated from each other by bit line 64 and wherein flux induced in such layers finds a substantially-closed flux path therebetween separated only by the aforementioned insulating layers. Holes 72 are suitably oriented with respect to memory element 60 and coperate with holes 46 of shield-plate 30 and apertures 42 of shield 34 permitting unobstructed passage therethrough in memory plane 12.

Figure 6:
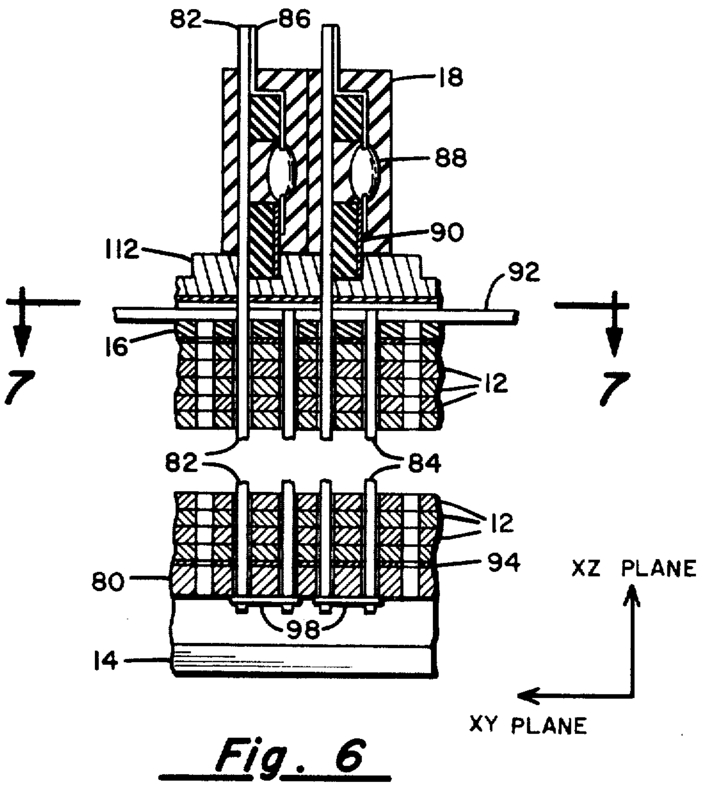
FIG. 6 is an illustration of a sectional view of the memory stack of FIG. 1 taken along the YZ plane.

With particular reference to FIG. 6 there is presented a sectional view taken along a YZ plane of FIG. 1. This view illustrates the vertically staked relationship of base plate 14 and top plate 16 sandwiching there between a plurality of memory planes 12. This view illustrates that each word line is composed of two separate portions: diode-bus word line 82 that at its bottom limit extends to bottom plate 80 and at its top limit extends to a diode assembly 18 wherein word line 82 is welded, or soldered, to a suitable conductive strap 86; microdiode 88 is in turn welded, or soldered, between conductive strap 86 and common diode bus 90 to which all diodes 88 in the same XZ plane are attached; word line 84, as does word line 82, runs from its bottom terminus at bottom plate 80, through the stacked superposed apertures of memory planes 12, through top plate 16 but terminates in common-bus 92 as does all word lines 84 in the same YZ plane. Common-bus 92 terminates in common bus leads 22, as illustrated in FIGURE 1. Each pair of word lines 82, 84 are interconnected at their bottom ends by their being welded, or soldered, to coupling strips 98. It will be appreciated then that the finished electrical and mechanical assembly provides a continuous electrical path through common-bus 92, word line 84, coupling strip 98, word line 82, conductive strap 86, diode 88, and common diode-bus 90. Further, it is to be appreciated that all word line pairs 82, 84, there being 1,024 such pairs in the illustrated embodiment of FIG. 1, are intercoupled in a like manner.

Figure 7:
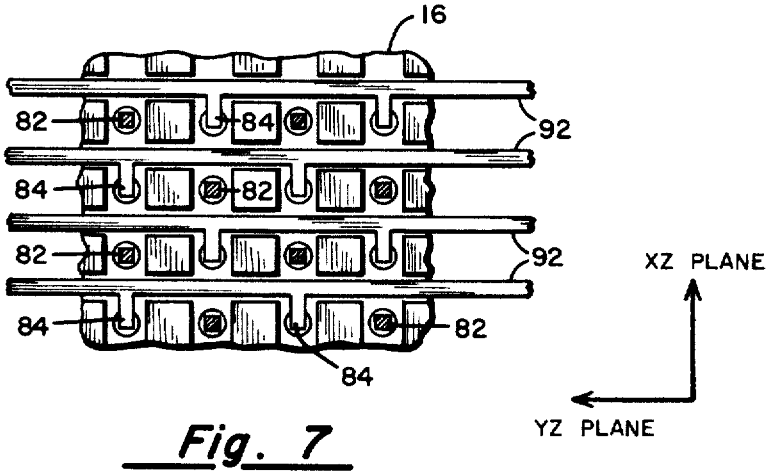
FIG. 7 is an illustration of a section view of the memory stack of FIG. 1 taken along the XY plane showing the word line and common-bus arrangement.

With particular reference to FIG. 7 there is illustrated a plan view of top plate 16 illustrating the XY orientation of word lines 82 and 84 and common-busses 92. As previously described with respect to FIGURE 6 all word lines 84 lying in the same YZ plane terminate at, and are coupled to, the same common-bus 92. Further, all word lines 82 pass through top plate 16 with all word lines 82 lying in the same XZ plane terminating in the same diode assembly 18.

With particular reference to FIG. 8 there is illustrated an isometric view of a cut away view of the top portion of a memory stack 10 shown for the purpose of better illustrating the electrical interconnections thereof. FIGURE 8 illustrates an open isometric view of a portion of top memory plane 12 showing substrate 32 and shield 34 oriented within frame 52 of shield plate 30. Parallel running bit-sense lines 38, 40 are shown as coupling their respectively associated memory elements 60 along their respectively associated XZ plane and terminating in corresponding pairs of bit-sense leads 20. Superposed top memory plane 12 is top board 16 having a copper ground plane 99 and a plurality of parallel slots 100 through which run a plurality of common-busses 92 that terminate in associated common-bus leads 22 as illustrated in FIG. 1. Each common-bus 92, as more fully illustrated in FIGURE 7, is coupled to all word lines 84 lying in the same corresponding YZ plane. Succesisve common-busses 92 alternately terminate in common-bus leads 22 on opposite sides of memory stack 10 to provide maximum connector clearance therebetween. Superposed above top board 16 is diode assembly mounting board 102 having a copper ground plane 103 and upon which is mounted a plurality of diode assemblies 18. Each diode assembly 18 has 32 diode stations wherein there is provided a conductive strap 86 and a diode 88 welded, or soldered, to a common conductive strap 90 that runs along the diode assembly 18 providing a common-bus for all like oriented diodes 88. Each diode assembly 18 terminates at a conductive strap 104 that performs the function of providing an electrical connection between common conductive strap 90 and diode bus lead 24 as illustrated in FIGURE 1. Mounting board 102 has a plurality of apertures 106 that are oriented to match corresponding apertures 108 in top board 16 through which the plurality of word lines 82 are threaded. As stated before with particular respect to the discussion of FIGURE 6 the top terminal of word line 82 upon final assembly of memory stack 10 is welded, or soldered, to a corresponding oriented conductive strap 86 of a diode assembly 18. All diode assemblies 18 may be shimmed by an appropriate number of shims 110, such as Mylar sheet, so as to provide a compact assemblage in the Y-direction while matching with correspondingly located slots 112 in mounting board 102.

The 32 diode assemblies 18 are then secured in the Z-dimension by diode assembly clamping means 114.

With particular reference to FIG. 9 there is presented a diagrammatic illustration of a cross section of the mated-film memory element 60 and shield 34 that form the basic memory cell 120 of the present invention. The mated-film memory element 60 which is more fully described in the copending application of R. J. Bergman et al. ERA–1436, may be fabricated in accordance with the S. M. Rubens Patent Nos. 2,900,282 and 3,155,561 in which the element is formed in a continuous deposition process. In the preferred embodiment layers 62 and 66 are elements of 4,000 Angstroms (A.) in thickness of approximately 80% Ni=20% Fe vapor deposited upon a 0.0060 inch thick glass substrate 32 and have an overall planar dimension of approximately 0.020 inch in width and 0.650 inch in length. Layers 62 and 66 are separated by vapor deposited layers 122 and 124 of silicon monoxide (SiO) each of approximately 5,000 A. thickness that act as diffusing-preventing-layers between conductor 64 (common bit-sense lines 38, 40 of FIGURE 2), which is a copper strip of approximately 40,000 A. in thickness, and layers 62 and 66 during the deposition process. The final element of memory cell 120 is shield 34 which is a layer of high permeability material, such as a Conetic sheet, of approximately 0.0020 inch thickness which, as will be more fully described below, acts as a flux return path for the transverse drive field generated in the area of memory cell 120 by a current signal flowing through word lines 82 and 84. Additionally, there is illustrated the shielding effect of shield 34 and shield-plate 30 as electrically intercoupled by tabs 35, see FIGURE 2.

The memory plane assembly formed by the sandwich construction of substrate 32 through layer 66 (not including word lines 82 and 84 or shields 30 and 34) is an integral package and may be formed by a continuous deposition process as disclosed in the aforementioned S. M. Rubens Patent Nos. 2,900,282 and 3,155,561 or by separate layers suitably affixed by an adhesive material. In this arrangement of the preferred embodiment layers 62 and 66 are formed with an anisotropic axis in the closed direction whereby a current signal coupled to conductor 64 establishes a longitudinal drive field $H_l$ in the area of layers 62 and 66 in a circumferential direction of a first or a second and opposite direction representative of a stored "1" or "0" as a function of the polarity of the current signal applied thereto. With a proper current signal coupled to intercoupled word lines 82, 84 (by conductive strip 98) there is established in the area of cell 120 a transverse drive field $H_t$ that tends to align the magnetization M of layers 62 and 66 into substantial alignment along the hard axis of cell 120, i.e., along a line orthogonal to the easy axis of element 60.

Figure 10:
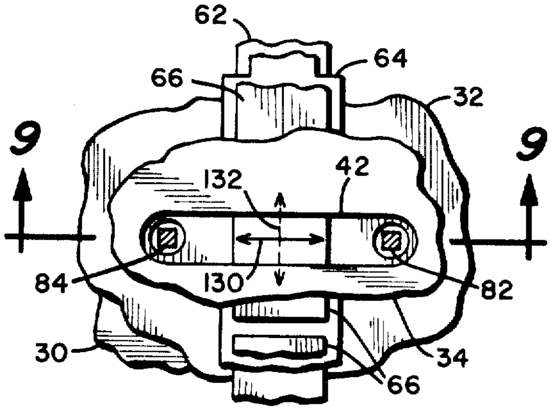
FIG. 10 is a diagrammatic illustration of a plan view of a memory element of FIG. 2.

With particular reference to FIG. 10 there is presented a diagrammatic illustration of a plan view of the memory cell 120 of the present invention of which FIG. 9 is a cross section taken along the plane formed by word lines 82, 84. In this illustration, nonfunctional parts such as layers 122 and 124 are omitted for the sake of clarity. This illustration shows the stacked arrangement of substrate 32, layer 62, conductor 64, layer 66 and shield 34. Additionally, there is illustrated the relationship of easy axis 130 and hard axis 132 of element 60 with respect to bit line 64 and word lines 82, 84. Additionally, there is shown the aperture 42 formed in shield 34; the ends of aperture 42 mate with matching holes 72 in substrate 32 (and holes 46 in shield plate 30) providing a means whereby word lines 82, 84 may pass through memory plane 12 and providing a proper orientation of word lines 82, 84 with cell 120.

Figure 11:
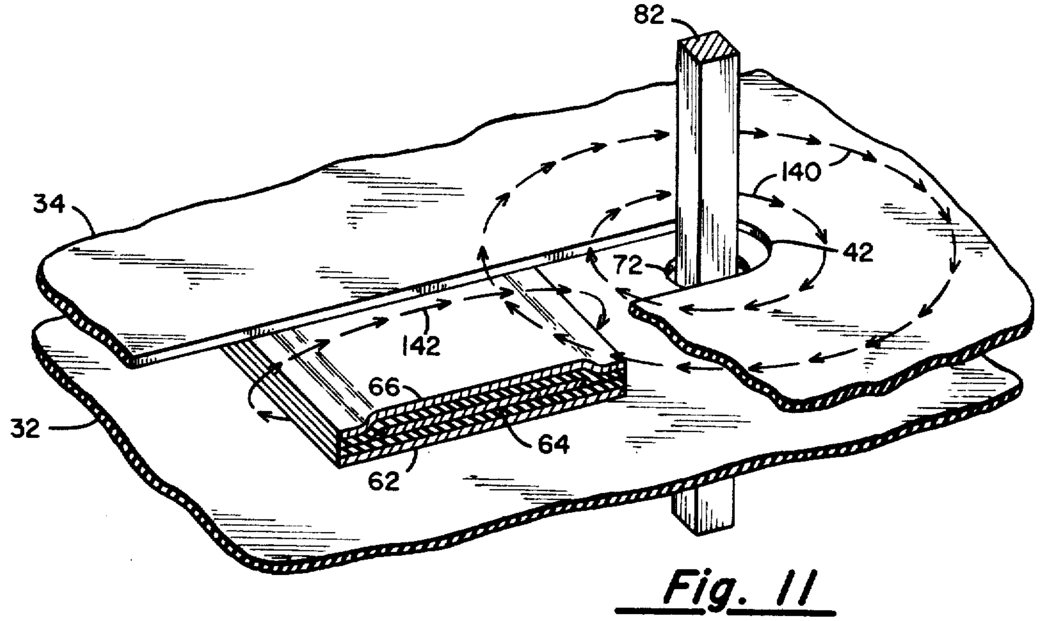
FIG. 11 is an isometric view of a portion of the memory element of FIG. 2.

With particular reference to FIG. 11 there is illustrated an isometric view of a portion of memory cell 120 at its interaction with the transverse drive field $H_t$ generated by an energized word drive line 82. This illustration is presented to show the general configuration of the path of the magnetic flux generated by a current signal flowing through word line 82. With a suitable current signal coupled to word line 82 there is established about word line 82 a magnetic field represented by arrows 140 flowing in a circumferential direction thereabout. This circumferential field about line 82 seeks a path of low reluctance and accordingly concentrates in the planar, partially-closed flux path presented by shield 34. Shield 34, except in the area of element 60 as caused by aperture 42 forms a continuous flux path of low reluctance. However, in the area of element 60 there is an air gap formed by aperture 42 presenting an area of high reluctance. This area of high reluctance in the area of element 60 formed by aperture 42 causes the flux flowing in shield 34, due to the current signal flowing through word line 82, to move down into the superposed layers 62 and 66 producing an area of high flux concentration in the area of element 60. This magnetic flux in the area of element 60 and aperture 42 in shield 34 is a transverse drive field $H_t$ oriented orthogonal to easy axis 130 tending to cause the magnetization M of element 60 to become aligned with hard axis 132. With an appropriate current signal coupled to bit line 64 there is established about bit line 64 a circumferential magnetic field schematically represented by arrows 142 which magnetic field is in substantial alignment with the easy axis 130 in the area of element 60. With the magnetic field schematically illustrated by arrows 140 established by a suitable current signal flowing through word line 82 being, in the area of element 60, in substantial alignment with hard axis 132 of element 60 there are provided two magnetic fields that are orthogonal to each other in the area of element 60 and that are vectorially additive such that by the proper selection of the relative field intensities, the magnetization of element 60 may be established into any one of a plurality of previously determined magnetic states.

Figure 12:
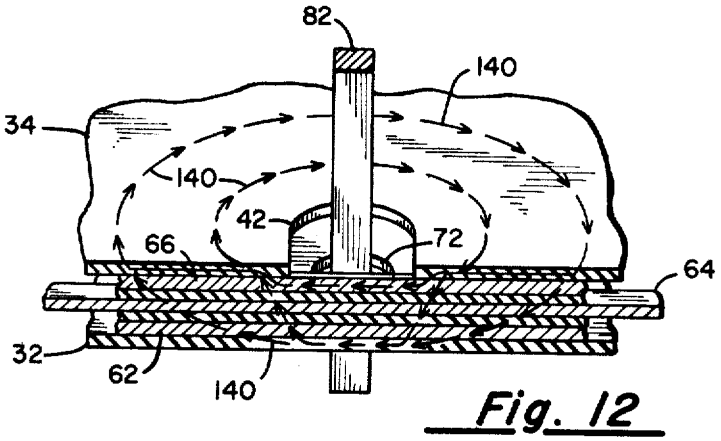
FIG. 12 is a diagrammatic illustration of a cross sectional view taken from FIG. 11.

With particular reference to FIG. 12 there is illustrated a diagrammatic illustration of a cross sectional view taken from FIG. 11 along the longitudinal axis of conductor 64. This illustration is presented to particularly point out the manner in which the magnetic field established by the current signal flowing through word line 82 and schematically illustrated by arrows 140 flows through the low reluctance path presented by shield 34 and when presented by the high reluctance path formed by aperture 42 moves out of shield 34 into layers 62 and 66 and then back up into shield 32 on the other side of aperture 42. Thus, it is particularly pointed out that the purpose of shield 34 is to act as a "keeper" for the transverse drive field $H_t$ generated by a current signal passing through word line 82 and by the action of aperture 42 therein concentrating such magnetic field in the area of element 60. The effect of "keeper" 34 is, by reducing the reluctance of the flux path of the transverse word drive fields to substantially reduce the current signal intensities required for the proper operation of element 60.

Figure 13:
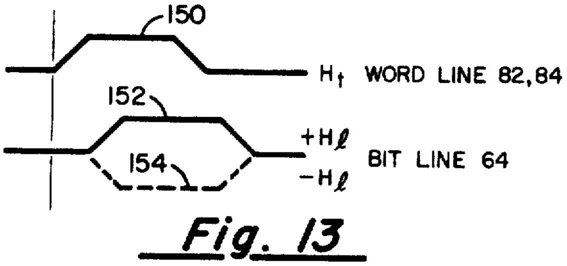
FIG. 13 is an illustration of the signal waveforms associated with the write operation of the memory element of FIG. 10.

With particular respect to FIG. 13 there are illustrated the waveforms of the current signals utilized to accomplish the write-in operation in memory cell 120 of FIGS. 9 and 10. In this arrangement transverse drive field 150 is initially applied to element 60 by a current signal flowing through word lines 82, 84 rotating the magnetization M of element 60 out of alignment with its anisotropic axis 130. Next, longitudinal drive field 152, for the writing for a "1" or longitudinal drive field 154 for the writing of a "0" is applied in the area of element 60 by suitable polarity current signals coupled to bit line 64 which longitudinal drive fields $H_l$ steer the magnetization of element 60 into the particular magnetic polarization along anisotropic axis 130 associated with the respective polarities of waveforms 152 and 154. With the magnetic fields established by suitable current signals flowing through word lines 80, 82 and bit line 64 (see FIGURE 10) being, in the area of area 60, in substantial alignment with hard axis 132 and easy axis 130, respectively, there are provided two magnetic fields orthogonal to each other in the area of area 60 that are vectorially additive. By the proper selection of the relative field intensities of such fields the magnetization M of area 60 may be established into any one of a plurality of previously determined magnetic states in a single domain rotational mode as disclosed in the S. M. Rubens et al. Patent No. 3,030,612.

Figure 14:
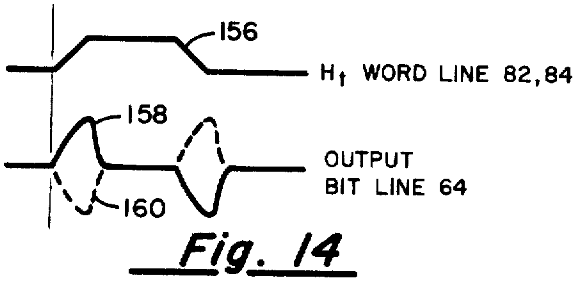
FIG. 14 is an illustration of the signal waveforms associated with the read operation of the memory element of FIG. 10.

With particular respect to FIG. 14 there are illustrated the signal waveforms associated with the readout operation of memory cell 120 of FIGS. 9 and 10. The readout operation is accomplished by the coupling of an appropriate current signal to word lines 82, 84 thus generating in the area of element 60 a transverse drive field 156 that only slightly rotates the magnetization of element 60 out of alignment with its anisotropic axis 130 inducing in bit line 64 output signal 158 or 160 indicative of a stored "1" or "0" respectively, in element 60. As illustrated here the polarity phase of the output signal during the readout operation is indicative of the informational state of the memory element concerned.

Figure 15:
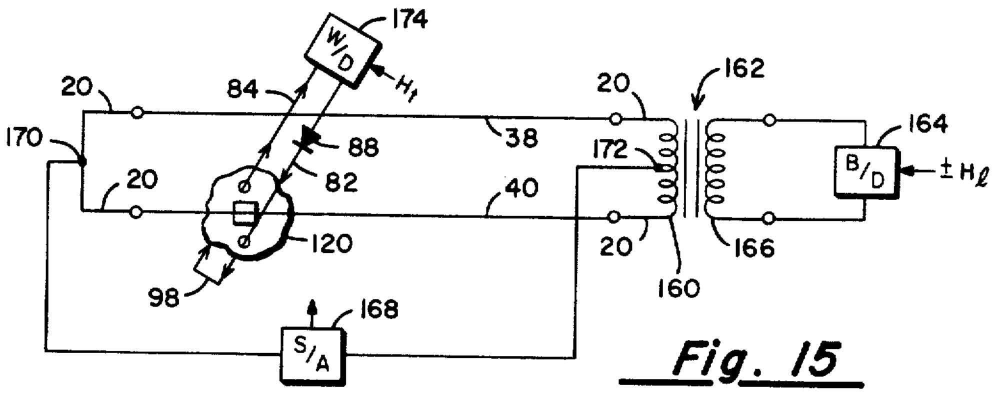
FIG. 15 is a schematic illustration of a typical circuit arrangement for the operation of the memory element of FIG. 10.

With particular reference to FIG. 15 there is presented a schematic illustration of a typical circuit arrangement for the operation of a memory cell 120. As previously described hereinabove memory plane 12 has two separate bit-lines 38, 40 that pass through the memory plane in a parallel manner; each separate bit line coupling one-half of the memory elements 60 of the memory plane 12. The parallel bit lines 38, 40 are at one end directly intercoupled across their bit-sense leads 20 while the opposite ends of the pair of bit-sense leads 20 are coupled across a first winding 160 of a selection transformer 162. The bit driver 164 is coupled to the parallel bit lines 38, 40 by means of a second winding 166 on selection transformer 162 providing transformer couplings of the bipolar longitudinal drive fields $H_l$ utilized by the writing operation. The differential sense amplifier 168 is coupled across the intercoupled first ends of the parallel bit lines 38, 40 at point 170 and a center tap 172 on the selection transformer 162 first winding 160. This arrangement permits the parallel bit lines 38, 40 to act as a balanced strip line pair providing common mode rejection of spurious noise signals at the differential sense amplifier 168. Parallel pairs of word lines are at their one end intercoupled by a strip 98 and at their other ends coupled to word driver 174 through the serially coupled bit line 82 and diode 88. Word driver 174 provides a current signal that causes the transverse drive field $H_t$ to be established in the area of memory cell 120. It is to be appreciated that only one of the 512 memory cells 120 that couple bit line 40 and that none of the 512 memory cells 120 that couple bit lines 38 are illustrated; it is to be recognized that each of the other, not illustrated, 1,023 memory cells 120 would have its own pair of word lines 82, 84 and an associated word driver 174.

As previously described the memory system incorporating the present invention is word-organized and is a two-ended selection system. For the read operation, i.e., energization of one fully selected word line (such as word line pairs 82, 84), it is required that one out of Y (32 in the illustrated embodiment) diode bus leads 24 and one of X (32 in the illustrated embodiment) common-bus leads 22 be concurrently selected; the one word line at the intersection of the selected diode bus lead 24 (along conductive strip 90, see FIG. 8) and the selected common bus 22 (along common bus 92, see FIG. 8) is selected by the coupling thereto by word driver 174 of a current signal establishing a transverse drive field $H_t$ in the areas of all memory cells 120 (128 in the illustrated embodiment). The transverse drive field $H_t$ rotates the magnetization of the coupled memory cells 120 out of alignment with their easy axes 130 inducing in the associated common bit-sense lines 38, 40 an output signal the polarity phase of which it is indicative of the informational state of the interrogated memory cell 120.

For the write operation one word line is fully selected as in the read operation (transverse drive field $H_t$ intensities may be different in the read and write operations depending on the system requirements) while concurrently the bit-sense line pairs 38, 40 of each memory plane 120 (128 in the illustrated embodiment) are energized by longitudinal drive field $\pm H_l$, the polarity of which is representative to the writing of a "1" or a "0" in the corresponding memory cell 120. The coincident application of the transverse drive field $H_t$ and the longitudinal drive field $\pm H_l$ steers the magnetization of the affected memory cells 120 into a magnetic polarization along their easy axes 130 corresponding to the polarity of the applied longitudinal drive field $H_l$.

Thus, it is apparent that there has been described and illustrated herein a preferred embodiment of the present invention that provides a novel memory, selection system and packaging scheme therefore providing an improved volumetric efficiency. It is understood that suitable modifications may be made in the structure as disclosed provided that such modifications come within the spirit and scope of the appended claims. Having, now, fully illustrated and described our invention, what we claim to be new and desire to protect by Letters Patent is set forth in the appended claims.

1. A magnetizable memory element, comprising:
- a nonmagnetizable, plan substrate member;
- said substrate member having first and second apertures therethrough forming a web therebetween;
- an open-flux path layer of magnetizable material;
- said layer affixed to said substrate member and oriented in the area of said web;
- a conductive strip oriented along said web and magnetically coupled to said layer;
- said layer and said conductive strip forming a memory area in the area of said web;
- binary information stored in said memory area in a first or second and opposite flux direction in said layer;
- a high permeability layer superposed said layer and having an aperture therethrough that extends across said memory area in said flux direction.

2. The element of claim 1 further including a ground plane member that is electrically intercoupled with said high permeability layer and sandwiching said substrate member therebetween for shielding said sandwiched substrate member's memory areas from external electromagnetic and electrostatic fields.

3. A magnetizable memory element, comprising:
- a nonmagnetizable, planar substrate member;

said substrate member having first and second apertures therethrough forming a web therebetween;
an open-flux-path layer of magnetizable material;
said layer affixed to said substrate member and oriented in the area of said web;
a conductive strip oriented along said web and magnetically coupled to said layer;
said layer and said conductive strip forming a memory area in the area of said web;
binary information stored in said memory area in a first or second and opposite flux direction in said layer;
first and second intercoupled word lines passing vertically through said apertures in said first and second substrate member, respectively, and enveloping said memory area;
an energized said first and second word line generating first and second planar magnetic fields, respectively, thereabout which planar fields are additive fields that are orthogonal to said flux direction;
an energized said enveloped conductive strip generating in said memory area first or second and opposite direction circumferential magnetic fields about said conductive strip, said planar magnetic fields and said circumferential magnetic fields vectorially additive in said memory area for setting the magnetization of said layer in said first or second and opposite flux direction;
said planar magnetic fields in said memory area affecting the remanent magnetization of said memory area inducing in said conductive strip a signal that is indicative of the information state of said memory area.

4. A magnetizable memory element, comprising:
a nonmagnetizable, planar substrate member;
said substrate member having first and second apertures therethrough forming a web therebetween;
a first thin-ferromagnetic-field layer of magnetizable material having single domain properties and possessing the property of uniaxial anisotropy for providing in the plane of said layer an easy axis along which the layer's remanent magnetization shall reside in a first or second and opposite direction;
said first film layer affixed to said substrate number and oriented in the area of said web;
a first insulating layer superposed said first film layer;
a conductive strip superposed said first film layer in the area of said web;
a second insulating layer superposed said conductive strip;
a second thin-ferromagnetic-film layer having substantially similar magnetic charatceristics and planar contours as said first film layer and superposed said first film layer with their easy axes aligned;
said superposed first and second film layers sandwiching and enveloping said conductive strip therebetween and having sides overlapping and enveloping said conductive strip at at least a portion of said conductive strip for forming closely-coupled mated-film portions on opposing sides of said conductive strip for creating a substantially-closed circumferential flux path about said enveloped conductive strip;
said superposed first and second film layers and said enveloped conductive strip forming a memory area;
binary information stored in said memory area in said circumferential flux path in a first or second and opposite circumferential flux direction about said enveloped conductive strip;
a high permeability layer superposed said first and second film layers and having an aperture therethrough that extends across said memory area in said circumferential flux direction;
first and second intercoupled word lines passing vertically through said apertures in said first and second substrate member, respectively, and through said aperture in said high permeability layer for enveloping said memory area; and
an energized said first and second word line generating first and second planar magnetic fields, respectievly, thereabout which planar fields are conducted along the partially-closed, planar, flux paths presented by said high permeability layer but which fields in the area of said high permeability layer aperture flows into said memory areas as additive fields that are orthogonal to said circumferential flux path.

5. A magnetizable memory element, comprising:
an electrically-insulating nonmagnetizable, planar substrate member;
said substrate member having first and second apertures therethrough forming a web therebetween;
a first thin-ferromagnetic-film layer of magnetizable material having single domain properties and possessing the property of uniaxial anisotropy for providing in the plane of said layer an easy axis along which the layer's remanent magnetization shall reside in a first or second and opposite direction;
said first film layer affixed to said substrate number and oriented with its easy axis across and in the area of said web;
a first insulating layer affixed to and superposed said first film layer at least in the area of said web;
a conductive strip affixed to said first insulating layer at least in the area of said web and having its magnetic axis oriented substantially parallel to said first layer's easy axis in the area of said web;
a second insulating layer affixed to and superposed at least a portion of said conductive strip;
a second thin-ferromagnetic-field layer having substantially similar magnetic charatceristics and planar contours as said first film layer and superposed said first film layer with their easy axes aligned;
said superposed first and second film layers sandwiching and enveloping said conductive strip therebetween and having sides overlapping and enveloping said conductive strip at at least a portion of said conductive strip for forming closely-coupled mated-film portions on opposing sides of said conductive strip for creating a substantially-closed circumferential flux path about said enveloped conductive strip;
said superposed first and second film layers and said enveloped conductive strip forming a memory area;
binary information stored in said memory area in a first or second and opposite circumferential flux direction about said enveloped conductive strip;
a high permeability layer superposed said first and second film layers and having an aperture therethrough that extends across said memory area in said circumferential flux direction;
first and second intercoupled word lines passing vertically through said apertures in said first and second substrate member, respectively, and through said aperture in said high permeability layer and enveloping said memory area;
an energized said first and second word line generating first and second planar magnetic fields, respectively, thereabout which planar fields are conducted along the partially-closed flux paths presented by said high permeability layer but which planar fields in the area of said high permeability layer's aperture are driven down into said memory areas as additive fields that are orthogonal to said circumferential flux direction;
an energized said enveloped conductive strip generating said memory area first or second and opposite direction circumferential magnetic fields about said conductive strip, said planar fields and said circumferential fields vectorially additive in said memory area for setting the magnetization of said memory area in said first or second and opposite circumferential flux direction about said enveloped conductive strip in a single domain rotational mode as a first or second informational state, respectively;

said planar fields in said memory area affectively the remanent magnetization of same memory area for inducing in said developed conductive strip a signal that is indicative of the informational state of said memory area.

6. A two-dimensional array of magnetizable memory elements, comprising:

a nonmagnetizable, planar substrate member having a plurality of pairs of apertures therethrough, each pair of apertures forming a web therebetween, said pairs of apertures arranged in a matrix array of first and second orthogonally arranged parallel sets of planar X and Y dimension axes for forming a unique memory address for a memory area thereat;

each of said memory areas including two planar layers of magnetizable material;

said film layers associated with each of said memory areas superposed each other;

a separate conductive strip associated with and inductively coupled to each of said memory area's superposed layers for forming a circumferential flux path about said conductive strip;

each of said memory areas arranged on a separate one of said webs;

conductive strips of separate memory areas on said substrate member intercoupled;

a separate word line passing vertically through each of said pairs of apertures in said substrate member;

the selection of one word line generating a planar magnetic field about the associated word line which planar field is orthogonal to said memory area's circumferential flux path;

selected intercoupled conductive strips generating in the associated memory areas a first or a second and opposite direction circumferential magnetic field about said intercoupled conductive strips, said planar magnetic field and said circumferential magnetic fields if coincident at a fully selected memory area vectorially additive in said fully selected memory area for setting the magnetization of said memory area in a first or second and opposite circumferential direction about said associated enveloped conductive strip in a single domain rotational mode as a first or second information state, respectively;

the selection of one word line affecting the remanent magnetization of the selected memory area for inducing in said associated enveloped conductive strip a signal that is indicative of the informational state of said selected memory area.

7. A two-dimensional array of magnetizable memory elements, comprising:

an electrically-insulating nonmagnetizable, planar substrate member having a plurality of pairs of first and second apertures therethrough, each pair of apertures forming a web therebetween, said pairs of apertures arranged in a matrix array of first and second orthogonally arranged parallel sets of planar X and Y dimension axes, one pair of apertures at each X and Y axis intersection for forming a unique memory address for a memory area thereat;

each of said memory areas including two planar open-flux-path thin-ferromagnetic-film layers of magnetizable material having single domain properties and possessing the property of uniaxial anisotropy for providing in the plane of each of said layers an easy axis along which the layer's remanent magnetization shall reside in a first or second and opposite direction;

said two film layers associated with each of said memory areas superposed with their easy axes aligned;

a separate conductive strip associated with and sandwiched between and enveloped by at least a portion of each of said memory area's superposed film layers for forming closely-coupled mated-film portions on opposite sides of said conductive strip for forming a substantially-closed circumferential flux path about said enveloped conductive strip that is substantially parallel said easy axes;

each of said memory areas arranged on a separate one of said webs with their easy axes aligned with the associated pair of apertures;

a high permeability layer superposed said substrate member for sandwiching said plurality of memory areas therebetween and having a plurality of elongated apertures therethrough, one elongated aperture associated with each memory area, wherein each elongated aperture extends across the associated memory area parallel said circumferential flux path;

conductive strips of separate memory areas on said substrate member intercoupled;

pairs of first and second intercoupled word lines passing vertically through associated pairs of first and second apertures, respectively, in said substrate member and through the associated elongated aperture in said high permeability layer;

each first word line of all memory areas along an X axis coupled through an associated diode to a common X dimension word line bus;

each second word line of all memory areas along a Y axis coupled to a common Y dimension word line bus;

the concurrent selection of one X dimension word line bus and one Y dimension word line bus generating first and second planar magnetic fields, respectively, about the associated first and second word lines which planar fields are conducted along the partially-closed flux paths presented by the high permeability layer but which fields in the area of said high permeability layer's elongated aperture flow down into the associated memory area as additive fields that are orthogonal to said memory area's circumferential flux path;

selected intercoupled conductive strips generating in the associated memory areas first and second and opposite direction circumferential magnetic fields about said intercoupled conductive strips, said planar magnetic fields and said circumferential magnetic fields if coincident at a fully selected memory area vectorially additive in said fully selected memory area for setting the magnetization of said memory area in a first or second and opposite circumferential direction about said associated enveloped conductive strip in a single domain rotational mode as a first or second information state, respectively; and said concurrent selection of one X dimension word line bus and one Y dimension word line bus affecting the remanent magnetization of the selected memory area for inducing in said associated enveloped conductive strip a signal whose polarity phase is indicative of the informational state of said selected memory area.

8. A three-dimensional array of magnetizable memory elements comprising:

a plurality of stacked, superposed two-dimensional planar arrays, each including;

a nonmagnetizable, planar substrate member having a plurality of pairs of apertures therethrough, each pair of apertures forming a web therebetween with each of said pairs of apertures forming a unique memory address for a memory area thereat;

each of said memory areas including a planar layer of magnetizable material;

a separate conductive strip magnetically coupled to each of said layers for determining a circumferential flux path about said conductive strip;

each of said memory areas arranged on a separate one of said webs;

a high permeability layer superposed said substrate member for sandwiching said plurality of memory areas therebetween and having a plurality of apertures therethrough, one aperture associated with each memory area, wherein each aperture extends over the associated memory area in said circumferential flux path;

conductive strips of separate memory areas on said substrate member intercoupled; and pairs of intercoupled word lines passing vertically through said stacked planar arrays through associated pairs of apertures in said substrate member and through the associated aperture in said high permeability layer.

9. A three-dimensional array of magnetizable memory elements, comprising:

a plurality of stacked, superposed two-dimensional planar arrays, each including;

a nonmagnetizable, planar substrate member having a plurality of pairs of apertures therethrough, each pair of apertures forming a web therebetween for forming a memory area thereat;

each of said memory areas including two planar layers of magnetizable material having single domain properties and an easy axis;

said layers superposed with their easy axes aligned;

a separate conductive strip sandwiched between and enveloped along its sides by each of said pair of superposed layers for determining a circumferential flux path along said easy axes and about said enveloped conductive strip;

each of said memory areas arranged on a separate one of said webs;

a high permeability layer superposed said substrate member for sandwiching said plurality of memory areas therebetween and having a plurality of apertures therethrough, one aperture associated with each memory area, wherein each aperture extends across the associated memory area in said circumferential flux path and parallel said easy axes;

a ground plane sandwiching said substrate member between it and said high permeability layer;

conductive strips of separate memory areas on said substrate member intercoupled;

pairs of intercoupled word lines passing vertically through said stacked planar arrays through associated pairs of apertures in said substrate members and through the associated aperture in said high permeability layers; and the selection of one pair of intercoupled word lines generating first and second planar magnetic fields which planar fields are conducted along the partially closed flux paths presented by the high permeability layer but which fields in the area of said high permeability layer aperture are driven down into the associated memory area as additive fields that are orthogonal to said memory area's easy axes.

10. A three-dimensional array of magnetizable memory elements, comprising:

a plurality of stacked, superposed two-dimensional planar arrays, each including;

a nonmagnetizable, planar substrate member having a plurality of pairs of apertures therethrough, each pair of apertures forming a web therebetween with each of said pairs of apertures forming a unique memory address for a memory area thereat;

each of said memory areas including two planar layers of magnetizable material;

said layers superposed;

a separate conductive strip magnetically coupled to each of said pair of layers for determining a circumferential flux path about said conductive strip;

each of said memory areas arranged on a separate one of said web;

a high permeability layer superposed said substrate member for sandwiching said plurality of memory areas therebetween and having a plurality of apertures therethrough, one aperture associated with each memory area, wherein each aperture extends over the associated memory area in the area of said circumferential flux path;

conductive strips of separate memory areas on said substrate member intercoupled;

a plurality of pairs of intercoupled word lines, each pair passing vertically through said stacked planar arrays through an associated pair of apertures in each of said substrate member and through the associated apertures in each of said high permeability layer of each planar array;

the selection of one pair of intercoupled word lines generating first and second planar magnetic fields which planar fields are conducted along the partially-closed flux paths presented by the high permeability layer but which fields in the area of said high permeability layer aperture are driven down into the associated memory area as additive fields that are orthogonal to said memory area's circumferential flux path;

selected intercoupled conductive strips of each planar array generating in the associated memory areas first or second and opposite direction circumferential magnetic fields about said intercoupled conductive strips, said planar magnetic fields and said circumferential magnetic fields if coincident at a fully selected memory area vectorially additive in said fully selected memory area for setting the magnetization of said memory area in a first or second and opposite circumferential direction about said associated enveloped conductive stip in a single domain rotational mode as a first or second informational state, respectively; and a selected pair of intercoupled word lines affecting the remanent magnetization of the selected memory areas for inducing in each of said associated enveloped conductive strips of a signal that is indicative of the information state of said associated selected memory area.

11. A three-dimensional array of magnetizable memory elements, comprising:

a plurality of stacked, superposed two-dimensional planar arrays, each including;

a nonmagnetizable, planar substrate member having a plurality of pairs of a first and a second aperture therethrough, each pair of apertures forming a web therebetween, said pairs of apertures arranged in a matrix array of first and second orthogonally arranged parallel sets of planar X and Y dimension axes for forming unique memory addressess for associated memory areas thereat;

each of said memory areas including two planar thin-ferro-magnetic-film layers of magnetizable material having single domain properties and possessing the property of uniaxial anisotropy for providing in the plane of said layer an easy axis along which the layer's remanent magnetization shall reside in a first or second and opposite direction;

said two film layers that are associated with each of said memory areas, superposed with their easy axes aligned;

a separate conductive strip sandwiched between and enveloped by at least a portion of each of said memory area's superposed film layers for forming closely-coupled mated-film portions on opposite sides of said conductive strip for forming a substantially-closed circumferential flux path about said enveloped conductive strip and parallel said easy axes;

each of said memory areas arranged on a separate one of said webs with their easy axes aligned with the associated pair of apertures;

a high permeability layer superposed said substrate member for sandwiching said plurality of memory areas therebetween and having a plurality of apertures therethrough, one aperture associated with each memory area, wherein each aperture extends across the associated memory area parallel said circumferential flux path;

a ground plane sandwiching said substrate member between it and said high permeability layer;

conductive strips of separate memory areas on said substrate member intercoupled for forming a Z dimension selection bus;

pairs of first and second intercoupled word lines passing vertically through said stacked planar arrays through associated said pairs of first and second apertures, respectively, in each of said substrate members and through the associated aperture in each of said high permeability layers;

each first word line of all memory areas along an X axis coupled through a separately associated diode to a common X dimension word line bus;

each second word line of all memory areas along a Y axis coupled to a common Y dimension word line bus;

the concurrent selection of one X dimension word line bus and one Y dimension word line bus generating first and second planar magnetic fields, respectively, about the associated first and second word lines which planar fields are conducted along the partially closed flux paths presented by the high permeability layer but which fields in the area of said high permeability layer's aperture are driven down into the associated memory area as additive fields that are orthogonal to said memory area's circumferential flux path;

a selected Z dimension selection bus generating in the associated memory areas first or second and opposite direction circumferential magnetic fields about said intercoupled conductive strips, said planar magnetic fields and said circumferential magnetic fields if coincident at a fully selected memory area vectorially additive in said fully selected memory area for setting the magnetization of said memory area in a first or second and opposite circumferential direction about said associated enveloped conductive strip in a single domain rotational mode as a first or second informational state, respectively; and said concurrent selection of one X dimension word line bus and one Y dimension word line bus affecting the remanent magnetization of the selected memory areas for inducing in each of said associated enveloped conductive strips a signal that is indicative of the informational state of said associated memory area.

12. A three-dimensional array of magnetizable memory elements, comprising:

a plurality of stacked, superposed two-dimensional planar arrays, each including;

an electrically-insulating nonmagnetizable, planar substrate member having a plurality of pairs of apertures therethrough, each pair of apertures forming a web therebetween, said pairs of apertures arranged in a matrix array of first and second orthogonally arranged parallel sets of planar X and Y dimension axes, one pair of apertures at each X axis and Y axis intersection for forming a unique memory address for a memory area thereat;

each of said memory areas including two planar open-flux-path thin-ferromagnetic-film layers of magnetizable material having single domain properties and possessing the property of uniaxial anisotropy for providing in the plane of said layer an easy axis along which the layer's remanent magnetization shall reside in a first or second and opposite direction;

said two film layers that are associated with each of said memory areas, superposed with their easy axes aligned;

a separate conductive strip sandwiched between and enveloped by at least a portion of each of an associated one of said memory area's superposed film layers for forming closely-coupled mated-film portions on opposite sides of said conductive strip for forming a substantially-closed circumferential flux path about said enveloped conductive strip and parallel said easy axes;

each of said memory areas arranged on a separate one of said webs with their easy axes aligned with the associated pair of apertures;

a high permeability layer superposed said substrate member for sandwiching said plurality of memory areas therebetween and having a plurality of elongated apertures therethrough, one elongated aperture associated with each memory area, wherein each elongated aperture extends across the associated memory area parallel said circumferential flux path;

conductive strips of separate memory areas on said substrate member intercoupled for forming a Z dimension selection bus;

pairs of first and second intercoupled word lines passing vertically through said stacked planar arrays through associated apertures of said pairs of apertures in each of said substrate members and through the associated elongated aperture in each of said high permeability layers;

each first word line of all memory areas along the X axis coupled through a separately associated diode to a common X dimension word line bus;

each second word line of all memory areas along a Y axis coupled to a common Y dimension word line bus;

the concurrent selection of one X dimension word line bus and one Y dimension word line bus generating first and second planar magnetic fields, retspectively, about the associated first and second word lines which planar fields are conducted along the partially closed flux paths presented by the high permeability layer but which fields in the area of said high permeability layer's elongated aperture are driven down into the associated memory areas as additive fields that are orthogonal to said memory area's circumferential flux path;

a selected Z dimension selection bus generating in the associated memory areas first or second and opposite direction circumferential magnetic fields about said intercoupled conductive strips, said planar magnetic fields and said circumferential magnetic fields if coincident at a fully selected memory area vectorially additive in said fully selecter memory area for setting the magnetization of said memory area in a first or second and opposite circumferential direction about said associated enveloped conductive strip in a single domain rotational mode as a first or second informational state, respectively; and said concurrent selection of one X dimension word line bus and one Y dimension word line bus affecting the remanent magnetization of the selected memory areas for inducing in said associated enveloped conductive strips signals that are indicative of the informational state of said memory areas.

References Cited

UNITED STATES PATENTS

| | | | |
|---|---|---|---|
| 3,353,169 | 11/1967 | Halverson | 340—174 |
| 3,354,445 | 11/1967 | Prohofsky et al. | 340—174 |
| 3,382,491 | 5/1968 | Bergman | 340—174 |

TERRELL W. FEARS, *Primary Examiner.*

S. B. POKOTILOW, *Assistant Examiner.*

UNITED STATES PATENT OFFICE

CERTIFICATE OF CORRECTION

Patent No. 3,435,435 March 25, 1969

Robert J. Bergman et al.

It is certified that error appears in the above identified patent and that said Letters Patent are hereby corrected as shown below:

Column 10, line 52, "plan" should read -- planar --. Column 11, line 30, after "area" insert -- for --. Column 13, line 3, "affectively" should read -- affecting --; line 71, after "said", first occurrence, cancel "two"; same line 71, after "said", second occurrence, insert -- two --. Column 14, line 41, "and", first occurrence, should read -- or --. Column 16, line 32, "stip" should read -- strip --. Column 18, line 53, "selecter" should read --selected --.

Signed and sealed this 7th day of April 1970.

(SEAL)
Attest:

Edward M. Fletcher, Jr.
Attesting Officer

WILLIAM E. SCHUYLER, JR.
Commissioner of Patents